United States Patent
Sakaguchi

(10) Patent No.: US 7,256,935 B2
(45) Date of Patent: Aug. 14, 2007

(54) LIGHT TRANSMISSION SHEET, REAR PROJECTION TYPE PROJECTOR, LIGHT TRANSMISSION SHEET MANUFACTURING DEVICE, PROGRAM, AND COMPUTER-READABLE MEDIUM

(75) Inventor: Masafumi Sakaguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/404,536

(22) Filed: Apr. 2, 2003

(65) Prior Publication Data

US 2004/0114229 A1 Jun. 17, 2004

(30) Foreign Application Priority Data

Apr. 3, 2002 (JP) ............................. 2002-101802
Mar. 26, 2003 (JP) ............................. 2003-085553

(51) Int. Cl.
*G03B 21/60* (2006.01)
*G03B 21/56* (2006.01)

(52) U.S. Cl. ....................... 359/460; 359/456; 359/457; 359/459

(58) Field of Classification Search ................ 359/449, 359/455–457, 459–460
See application file for complete search history.

(56) References Cited

U.S. PATENT DOCUMENTS

| | | | | |
|---|---|---|---|---|
| 5,513,036 A | * | 4/1996 | Watanabe et al. | 359/457 |
| 5,760,954 A | * | 6/1998 | Tatsuki et al. | 359/452 |
| 5,815,313 A | * | 9/1998 | Mitani et al. | 359/448 |
| 6,185,038 B1 | * | 2/2001 | Yamaguchi et al. | 359/457 |
| 6,280,063 B1 | * | 8/2001 | Fong et al. | 362/333 |
| 6,665,118 B2 | * | 12/2003 | Yamaguchi et al. | 359/453 |
| 6,836,363 B2 | * | 12/2004 | Goto et al. | 359/460 |
| 6,844,970 B2 | * | 1/2005 | Olczak | 359/460 |
| 2004/0027339 A1 | * | 2/2004 | Schulz | 345/173 |

FOREIGN PATENT DOCUMENTS

| | | |
|---|---|---|
| CA | 2 144 391 | 9/1995 |
| EP | 0 671 653 A1 | 9/1995 |
| JP | A 58-186732 | 10/1983 |
| JP | A 03-098040 | 4/1991 |
| JP | A 05-127257 | 5/1993 |
| JP | A-5-158153 | 6/1993 |
| JP | A 05-158153 | 6/1993 |
| JP | A 05-196807 | 8/1993 |
| JP | A 07-128745 | 5/1995 |
| JP | A-7-128745 | 5/1995 |
| JP | A-7-248537 | 9/1995 |

(Continued)

*Primary Examiner*—W. B. Perkey
*Assistant Examiner*—Magda Cruz
(74) *Attorney, Agent, or Firm*—Oliff & Berridge, PLC

(57) ABSTRACT

To eliminate ghosts caused by retroreflection of projected light and obtain high resolution images.

Fine irregularities 5 are randomly formed on the plane of incidence 2a of a Fresnel lens sheet 2 with little space between them. The glossiness (Gs 60°) of the fine irregularities 5 formed by such a random pattern is equal or less than 35%. The fine irregularities 5 are in a semispherical shape, the level difference is about 10 μm, and the maximum diameter is about 50 μm. Projected light L is scattered by the fine irregularities 5 at the plane of incidence 2a, subjected to vector resolution, and has its optical intensity weakened, so that retroreflection light can be prevented.

15 Claims, 9 Drawing Sheets

FOREIGN PATENT DOCUMENTS

| | | |
|---|---|---|
| JP | B2-2510809 | 4/1996 |
| JP | A 10-039117 | 2/1998 |
| JP | A 10-104434 | 4/1998 |
| JP | A 10-282315 | 10/1998 |
| JP | A-11-133508 | 5/1999 |
| JP | A 11-133508 | 5/1999 |
| JP | A-11-192696 | 7/1999 |
| JP | A 2000-221601 | 8/2000 |
| JP | A 2000-280267 | 10/2000 |
| JP | A 2001-014920 | 1/2001 |
| JP | 2001-033606 | 2/2001 |
| JP | A 2001-194657 | 7/2001 |
| JP | A 2002-23268 | 1/2002 |
| JP | A 2002-049031 | 2/2002 |

* cited by examiner

LIGHT TRANSMISSION SHEET, REAR PROJECTION TYPE PROJECTOR, LIGHT TRANSMISSION SHEET MANUFACTURING DEVICE, PROGRAM, AND COMPUTER-READABLE MEDIUM

BACKGROUND OF THE INVENTION

1. Field of Invention

The present invention relates to a light transmission sheet, a mirror, a rear projection type projector, a light transmission sheet manufacturing device, a program, and a computer-readable medium that allow ghost images caused by retroreflection of projected light to be reduce or eliminated and high resolution images to be obtained.

2. Description of Related Art

A related art rear projection type projector includes a projector unit provided in a case, a mirror that reflects projected light emitted from the projector unit, and a transmission screen provided at the front of the case. The transmission screen is made of a combination of a Fresnel lens sheet and a lenticular lens sheet. The Fresnel lens sheet serves as a convex lens that curves projected light expanded as it is projected and widened outwardly by a projection lens toward the viewer side, so that the light is substantially perpendicular to the screen. The lenticular lens sheet controls the diffusion direction of the projected light.

The structure of the above-described rear projection type projector suffers from ghost images caused by retroreflection on the screen as its depth is reduced due to the arrangement. The rear projection type projector for home use in particular must have a small thickness so that it can be placed in any location as desired. Therefore, the transmission screen and the mirror are positioned to close to each other. This causes retroreflection between the plane of incidence of the transmission screen and the mirror, which is why ghost images are easily generated.

FIG. 9 is a schematic of the principle of how such a ghost image is generated by the retroreflection. Light L projected from the projector unit is reflected off a mirror 1 and enters a Fresnel lens sheet 2. Normal projected light Lc to be proper image light comes into a lenticular lens sheet 3 and is projected on the viewer side. Meanwhile, part of the projected light L coming into the plane 2a of the Fresnel lens sheet is reflected off this sheet plane. The reflected light Lr is reflected again off the mirror 1 to be retroreflection light, which enters the Fresnel lens sheet 2, and is projected through the lenticular lens sheet 3 to form a ghost image Lg.

Related art techniques of eliminating such ghost images are disclosed by Japanese Patent Laid-Open Nos. Hei 5-158153 and Hei 11-133508. A lens sheet as disclosed by Japanese Patent Laid-Open No. Hei 5-158153 is provided with irregularities on the surface, which does not form the Fresnel lens, of the lens sheet in order to reduce or eliminate the ghost images caused by the retroreflection. The irregularities reduce or prevent the retroreflection of the projected light, and reduce ghost images. The shape of the irregularities may be mat, hairline, and semicylindrical, such as a lenticular lens.

A transmission screen as disclosed by Japanese Patent Laid-Open No. Hei 11-133508 has a mat surface having a fine irregularities shape on the surface of a light diffusion sheet including fine particles and the surface is provided along with a Fresnel lens sheet. Retroreflection light is diffused by the mat surface to prevent ghost images from forming. The mat surface is formed by thermal transfer process with a metal die, blasting, hairline working, or the like.

SUMMARY OF THE INVENTION

The lens sheet as disclosed by Japanese Patent Laid-Open No. Hei 5-158153 mainly employs hair line or lenticular as the irregularities shape, but the hair line or lenticular shape is regular in one direction and orthogonal to the lenticular lens of the transmission screen, and there is a problem that it may interfere with the lenticular lens to generate moiré. While this reference describes the mat surface as an example of the irregularities shape, it does not mention a specific kind of mat shape to use in order to address or solve the technical problem as disclosed by that reference.

In the transmission screen as disclosed by Japanese Patent Laid-Open No. Hei 11-133508, the mat surface is provided with a fine irregularities shape. However, the fine irregularities shape is defined in terms of haze value representing the degree of fogginess. (Total light transmission factor is a similar definition.) The retroreflection is a phenomenon caused depending upon the state of the plane of incidence of the Fresnel lens sheet, and the surface state cannot be represented in terms of haze value that represents the inner state of an object. This is because even for a desired haze value obtained with fine particles contained in a light diffusion sheet, retroreflection itself cannot be prevented when the surface of the light diffusion sheet is flat.

In addition, in the disclosed reference, the preferable range of haze value is in the range from 5% to 80%. When the haze value is high, images on the screen may appear blurry or difficult to view. As a result of tests conducted by the present inventor, when the haze value was equal or greater than 50%, the appeared image was much blurry and far from a high resolution image. Therefore, in order to obtain a high resolution image, the haze value should be as small as possible. According to the disclosure of the reference, it was demonstrated that ghost images were reduced when the haze value was 35% or 40%, but according to tests conducted by the present inventor, ghost images were not necessarily reduced depending upon the luminance of the projected light and the image contrast.

The present invention addresses or solves this and/or other disadvantages, and provides a light transmission sheet, a mirror, a rear projection type projector, and a light transmission sheet manufacturing device that allow ghost images caused by retroreflection of projected light to be eliminated and high resolution images to be obtained.

In order to address or achieve the above, a light transmission sheet for use in a rear projection type projector has fine irregularities formed on the plane of incidence to which projected light for an image enters, and the glossiness (Gs 60°) of the plane of incidence with the fine irregularities is equal to or less than 35%.

In the rear projection type projector, the retroreflection is caused when light is reflected off the plane of incidence of a light transmission sheet, such as a Fresnel lens sheet, and then reflected off a mirror as described above. When the fine irregularities formed on the plane of incidence can diffuse the reflected light, ghost images are reduced or eliminated. At the time, the scale to define the fine irregularities on the plane of incidence is preferably glossiness that defines the surface state of the plane of incidence. The use of haze value that indicates the degree of fogginess should not be suitable in defining the fine irregularities formed on the surface, because the retroreflection derives from reflection off the plane of incidence.

The light transmission sheet must efficiently transmit normal projected light to be image light so that the image quality is affected as little as possible. According to the conventional technique, however, the haze value is raised to scatter light and make ghost images less visible, and the haze value is used as the scale. In consideration of the cause of retroreflection, however, despite for high haze value, not only the retroreflection cannot be prevented depending upon conditions, but also image resolution is lowered according to the related art method. In addition, no object or solution thereto to keep the haze value low (to keep image resolution high) and reduce or prevent the retroreflection has been suggested.

Therefore, according to the invention, the fine irregularities formed on the surface are defined based on glossiness (Gs 60°), and ghost images caused by the retroreflection can be eliminated while the image resolution is not lowered. In this way, the resolution is maintained while reducing or preventing the retroreflection, and still ghost images are not observed.

The light transmission sheet may be integral with or separate from the Fresnel lens sheet, as detailed in the following description of exemplary embodiments. The light transmission sheet may be provided in any position as long as it is between the Fresnel lens sheet and the mirror and on the optical axis of projected light.

In a light transmission sheet for use in a rear projection type projector according to another aspect of the invention, in the above-described arrangement, the haze value is equal to or less than 33%. When the haze value is not more than 33%, high resolution can be maintained while the picture quality such as brightness and contrast is less affected.

In a light transmission sheet for use in a rear projection type projector according to another aspect of the invention, fine irregularities in shapes of semi-sphere, approximate circular cone, cylinder, and other shapes having a curved surface are randomly formed on the plane of incidence to which projected light for an image enters.

The fine irregularities on the surface diffuse the projected light in the periphery, so that ghost images can be reduced or prevented from forming. A related art applied cylinder shaped element such, as a lenticular lens, is arranged in a fixed direction and regularly, in other words it has directivity. Therefore, it could interfere with a lenticular lens that also has directivity, and causes moiré. According to the invention, however, fine irregularities having a cylinder shaped curved surface are formed randomly in terms of direction, size, and shape, and therefore they have no directivity. Consequently, there is no interference with the lenticular, and moiré is not generated. When the irregularities have shapes of semi-sphere or approximate circular cone, retroreflection light can be diffused in all directions, which is more effective.

A light transmission sheet for use in a rear projection type projector has fine irregularities in shapes of semi-sphere or approximate circular cone randomly formed on the plane of incidence to which projected light for an image enters, the level difference of the fine irregularities is in the range from 5 µm to 15 µm, and the maximum diameter of the fine irregularities is in the range from 35 µm to 65 µm.

When fine irregularities in shapes of semi-sphere or approximate circular cone were subjected to tests for various level differences and maximum diameters, the most preferable result to eliminate ghost images was obtained for the level difference in the range from 5 µm to 15 µm, and the maximum diameter of the fine irregularities in the range from 35 µm to 65 µm.

In a light transmission sheet for use in a rear projection type projector according to another aspect of the invention, in the above-described arrangement, a random pattern of the fine irregularities is generated, and then the fine irregularities are formed based on the pattern by an inkjet process.

When irregularities are printed by an inkjet process, a random pattern of fine irregularities is generated using a computer, and the pattern may be printed on the light transmission sheet, which is extremely easier in terms of pattern generation or production than thermal transfer of a fixed pattern using a die. In addition, since irregularities are directly printed on the surface of the light transmission sheet, the shapes can be flexibly changed over a period of time, which provides more flexibility in designing the fine irregularity shapes. For example, a plurality of fixed patterns are provided, a pattern is randomly selected from the fixed patterns during pattern printing on one light transmission sheet, and fine irregularities may be formed based on the selected pattern. A plurality of light transmission sheets may be provided with different patterns of fine irregularities specific to the sheets. Since no die is used, wasted dies are not produced when the patterns are changed, which are less costly and environmentally-friendly as well.

In a rear projection type projector according to another aspect of the invention, the exit plane of the light transmission sheet is a Fresnel lens of a transmission screen. A light transmission screen for a normal rear projection type projector is made of a combination of a Fresnel lens sheet and a lenticular lens sheet. According to the invention, fine irregularities are formed on the plane of incidence of the light transmission sheet, and a Fresnel lens is formed on the exit plane, so that the Fresnel lens sheet and the light transmission sheet can be integrated. In this way, the optical path length between the sheets can be shortened. By this integration, the number of interfaces can be reduced, which can enhance the transmittance.

In a rear projection type projector according to another aspect of the invention, the light transmission sheet described above is formed between a Fresnel lens sheet and a mirror which form a transmission screen, and the plane of incidence and/or the exit plane of the light transmission sheet is provided with the fine irregularities.

The light transmission sheet is provided between the Fresnel lens sheet and the mirror, so that projected light otherwise directly entering the plane of incidence of the Fresnel lens sheet can be scattered by the fine irregularities of the light transmission sheet, retroreflection can be reduced or prevented and ghost images can be reduced or prevented from forming. Light reflected off the plane of incidence of the Fresnel lens sheet can be diffused by the exit plane at the light transmission sheet. Therefore, ghost images can be similarly eliminated. Fine irregularities may be formed at one of the plane of incidence or the exit plane of the light transmission sheet.

A light transmission sheet manufacturing device for manufacturing a light transmission sheet according to another aspect of the invention includes a pattern generation device to generate a fine irregularity pattern to arrange fine irregularities randomly on a light transmission sheet for printing, and a fine irregularity pattern printing device to form fine irregularities based on the generated pattern on the light transmission sheet by an inkjet process.

The inkjet process is preferably applied for the above reasons to form fine irregularities on a light transmission sheet. In addition, when fine irregularities are formed regularly, and a liquid crystal device having solid pixels for example (not to mention a display device having a lenticular lens) is used as a projection image source, the regularly arranged fine irregularities interfere with a pixel pattern and moiré is generated. In the light transmission sheet manufacturing device, a pattern is generated by the pattern generation device to generate a random fine irregularity pattern so that the fine irregularities are not arranged regularly, and fine irregularities are arranged on the light transmission sheet based on the generated pattern and printed by an inkjet process. In this way, moiré is not generated even when a display device having solid pixels is used.

The manufacturing device for the light transmission sheet according another aspect of the invention further includes, in the above arrangement, a fine irregularity shape selection device to select shapes of fine irregularities to be formed on the light transmission sheet from a plurality of samples. Unlike the related art case of using a die, irregularities are directly printed by inkjet process, and therefore the shapes can be immediately selected or selectively changed over a period of time, which provides more flexibility in forming various shapes of fine irregularities. The glossiness of the fine irregularities can be more readily and freely adjusted. For example, a plurality of fixed patterns are provided, a pattern is randomly selected during printing patterns on one light transmission sheet, and fine irregularities may be formed based on the selected pattern. A plurality of light transmission sheets may be provided with different patterns of fine irregularities specific to the sheets.

A fine irregularities forming program executable by a computer according to another aspect of the invention, includes: a pattern generation program for generating a fine irregularity pattern to arrange fine irregularities randomly on a light transmission sheet for printing, and a fine irregularity pattern printing program for forming fine irregularities based on the generated pattern on the light transmission sheet by an inkjet process.

A computer-readable medium storing a program executable by a computer according to another aspect of the invention, includes: a pattern generation program for generating a fine irregularity pattern to arrange fine irregularities randomly on a light transmission sheet for printing, and a fine irregularity pattern printing program for forming fine irregularities based on the generated pattern on the light transmission sheet by an inkjet process.

DETAILED DESCRIPTION OF PREFERRED EMBODIMENTS

Exemplary embodiments of the invention are described below in detail in conjunction with the accompanying drawings. The invention is not limited by the following exemplary embodiments. Elements of the exemplary embodiments may include those readily replaceable by a person skilled in the art or substantially the same as those.

First Exemplary Embodiment

Figure 1:
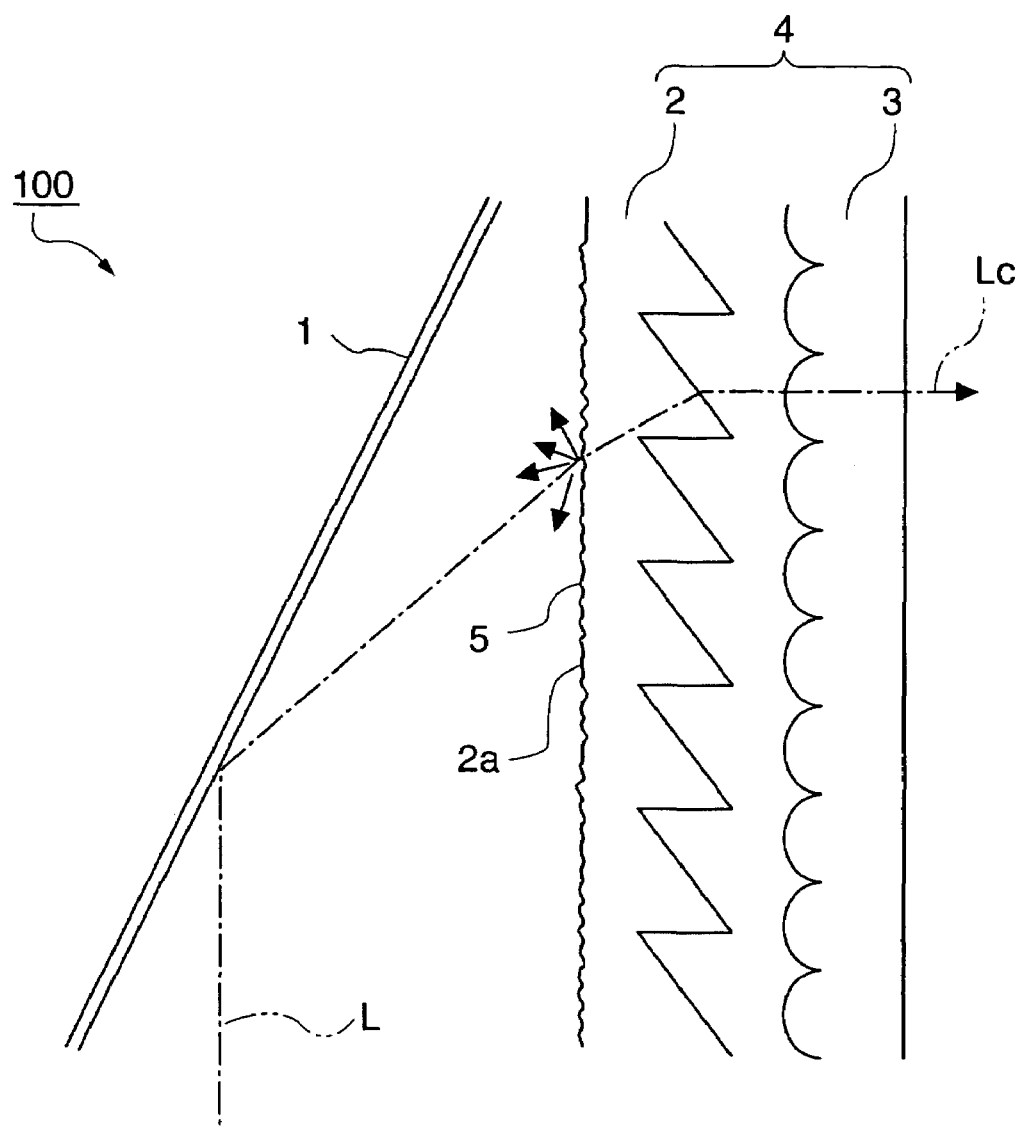
FIG. 1 is a schematic of a rear type projection liquid crystal projector according to a first exemplary embodiment of the invention.
Figure 2:
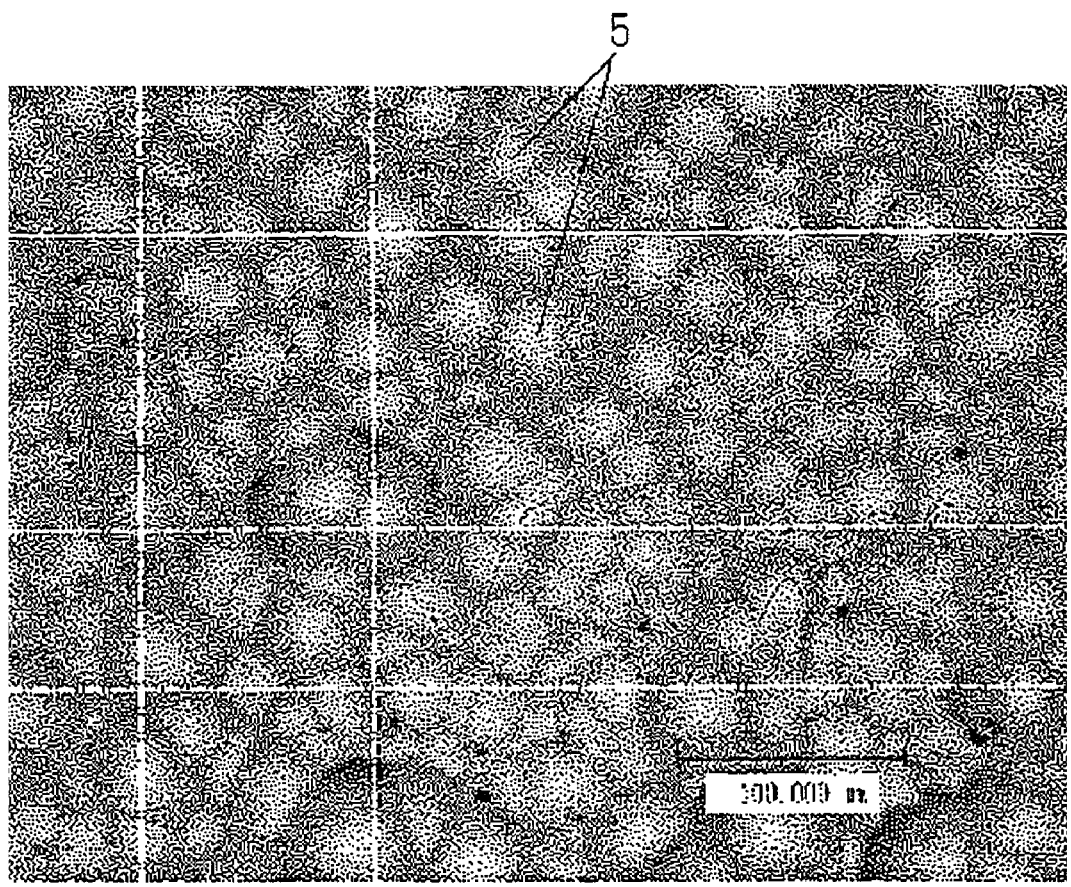
FIG. 2 is a graphic showing fine irregularities in detail.

FIG. 1 is a schematic showing a rear projection type, liquid crystal projector according to a first exemplary embodiment of the invention. The rear projection type, liquid crystal projector 100 includes a projector unit (not shown), a mirror 1 provided on the inner surface of a case, and a transmission screen 4 including a Fresnel lens sheet 2 and a lenticular lens sheet 3. The plane of incidence 2a of Fresnel lens sheet 2 is provided with fine irregularities 5 in a random manner substantially with no space between them. The fine irregularities 5 are made of semispherical projections as shown in FIG. 2. These projections are provided by an inkjet process (which are described below), casting process, or extrusion molding process with a die.

The material of the Fresnel lens sheet 2 may preferably be a composite resin material, such as polyvinyl chloride, polycarbonate, polymethacryl, polystyrene, polyethylene, and polyester because such a material is easy to mold. When the fine irregularities 5 are formed by the inkjet process, the same material as that of the Fresnel lens sheet 2 is preferably printed, but a different material from that of the Fresnel lens sheet 2 may be printed and the effect is still the same. Since a different material from the Fresnel lens sheet 2 may be used, any material suitable for the inkjet process or for optical diffusion may be selected regardless of the material of the Fresnel lens sheet 2. When casting process or extrusion molding process using a metal die is employed, fine irregularities can be formed, while the light transmission sheet is formed, which is advantageous in terms of production efficiency.

Figure 3:
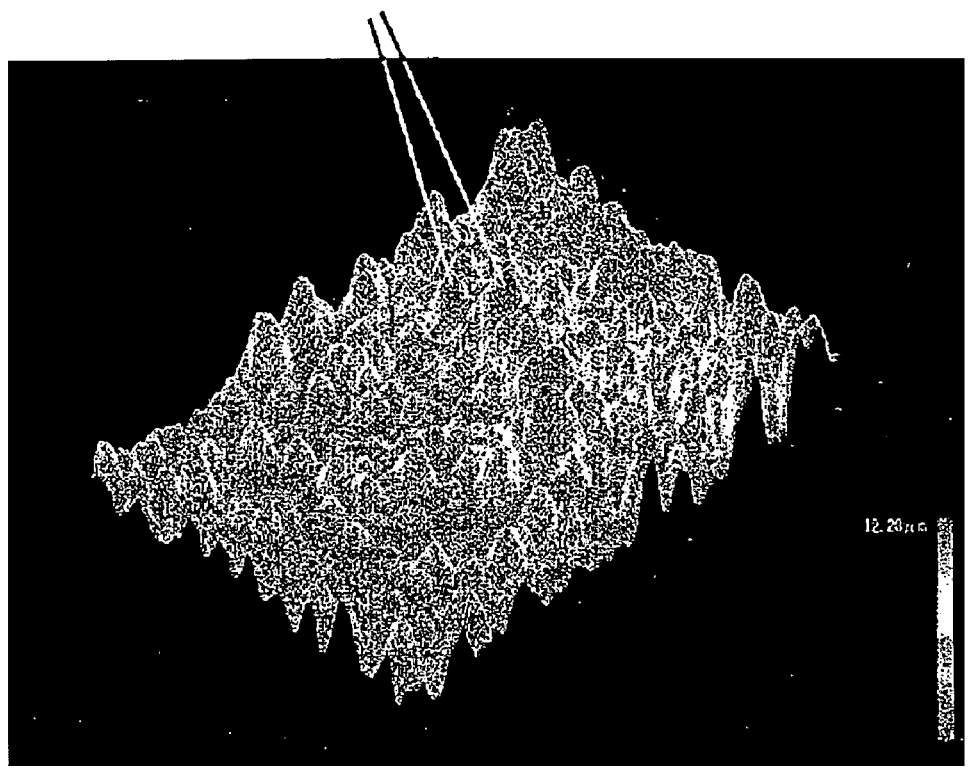
FIG. 3 is a graphic showing another example of fine irregularities.

When the fine irregularities 5 are in an approximate circular cone shape as shown in FIG. 3 for example, preferably, its level difference is about 10 μm, and the maximum diameter is about 50 μm. Then, the shapes are densely provided with little space between them, so that the most efficient arrangement is provided. The fine irregularities 5 at the Fresnel lens sheet 2 are preferably controlled in their shapes and positions so that the glossiness (Gs 60°) of the lens sheet is equal or less than 35%, and the haze value is equal or less than 33%. It was confirmed from the result of tests conducted by the applicant that with values in that order, high resolution was achieved and almost no ghost was visible. The test result by the applicant is given in Table 1.

TABLE 1

Haze value of various diffusion plates and blurriness by subjective evaluation

| diffusion plate | haze (%) | glossiness Gs 60° (%) | blurriness by subjective evaluation | retro-reflection by subjective evaluation |
|---|---|---|---|---|
| sample A by A corp. | 19.7 | 56.4 | ○ | X |
| sample B by A corp. | 33.9 | 22.0 | Δ | ○ |
| sample A by B corp. | 30.0 | 27.5 | ○ | ○ |
| sample B by B corp. | 86.9 | 8.3 | X | ○ |
| sample A by C corp. | 85.5 | 65.6 | X | X |
| sample B by C corp. | 97.8 | 93.8 | X | X |
| sample A by D corp. | 7.8 | 91.8 | ? | X |
| sample A by E corp. | 98.9 | 32.5 | X | ○ |

Other than the above, when the level difference is in the range from 5 μm to 15 μm, and the maximum diameter is in the range from 35 μm to 65 μm, ghost images are reduced or effectively eliminated. When the glossiness (Gs 60°) is in the range from 5% to 35%, ghost images are effectively eliminated. When the haze value is at least 5% and less than 35%, images with higher resolution than those by the conventional method can be provided.

The projected light L from the projector comes reflects off the mirror 1 and into the plane of incidence 2a of the Fresnel lens sheet 2. Here, normal projected light Lc as image light is projected to the viewer side through the lenticular lens sheet 3. Meanwhile, reflected light Lr at the plane of incidence 2a that would be a ghost image Lg by the related art method is scattered by the fine irregularities 5 and has its optical intensity attenuated. Therefore, the light Lr does not come back to the Fresnel lens sheet 2. In this way, the reflected light Lr does not overlap with the image light Lc, so that ghost images are not produced. Since the ghost images can be eliminated while the haze value is kept low, the picture quality is little affected, and images with higher resolution than those by the related art method can be provided. In other words, the ghost images are eliminated and at the same time better images with higher resolution can be provided.

Figure 4:
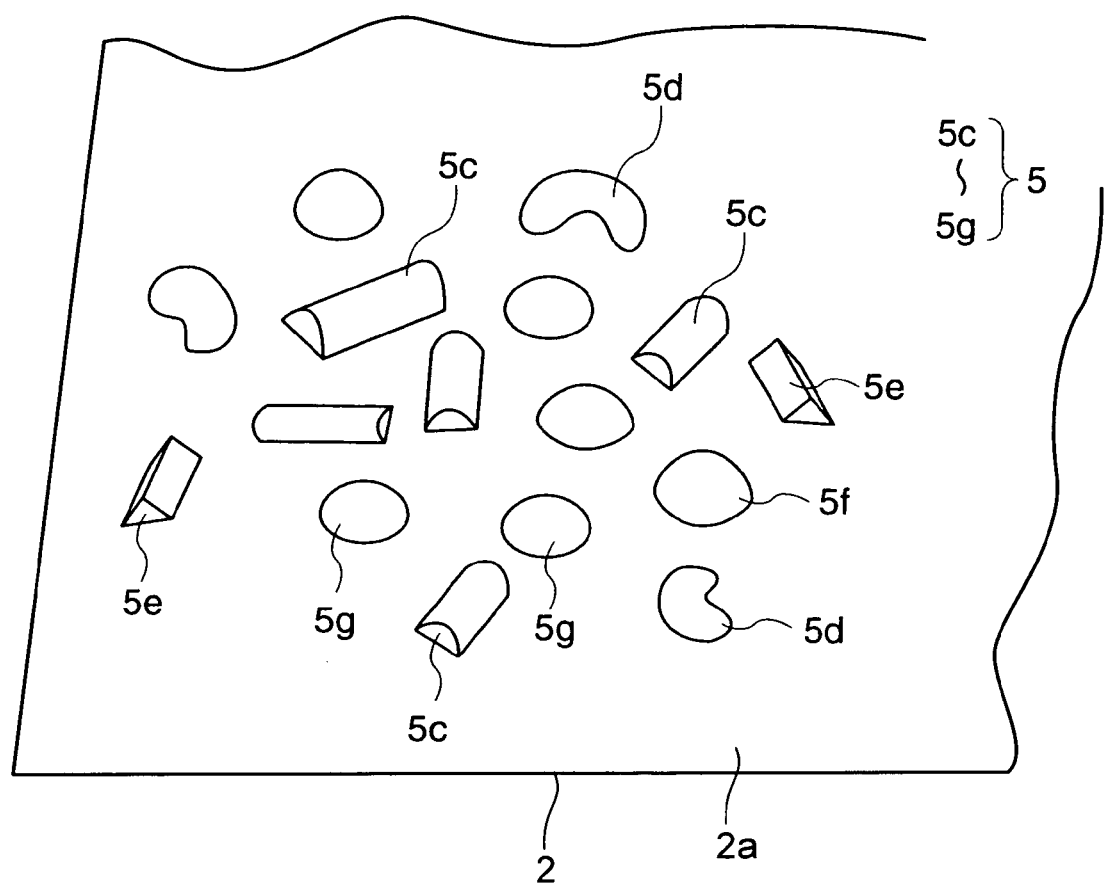
FIG. 4 is a schematic of another example of fine irregularities.

The shape of fine irregularities 5 may be not only semi-spherical as shown in FIG. 2, but also a tip-rounded circular cone like shape as shown in FIG. 3. The curved surface of the fine irregularities (as well as the shapes as shown in FIG. 4) can greatly diffuse projected light L and reduced or effectively prevent the retroreflection. The fine irregularities 5 preferably have a projection with a curved surface, so that a high light diffusion characteristic is provided. In addition, the irregularities are densely arranged to leave no flat surface part so that the glossiness (Gs 60°) may be low, and retroreflection can be more effectively reduced or prevented. The fine irregularities 5 do not have to have complete curved surfaces, but the curvature of the curves may vary a little and still the same effect can be provided. The curvature may vary or the level difference of the fine irregularities 5 may vary within a prescribed range in order to control the degree of glossiness (Gs 60°).

As shown in FIG. 2, multiple kinds of semispherical projections having different level differences and maximum diameters may be combined in a random manner to form the fine irregularities 5. In this arrangement, the size of the irregularities is randomly changed. In the conventional hairline pattern in which the irregularities are formed regularly and have directivity, such pattern caused moiré by interference with the lenticular lens. The irregularities 5 based on the random combination without regularity or directivity can reduce or prevent the moiré. When multiple different kinds of semispherical projections having different level differences and maximum diameters are randomly arranged in particular, the fine irregularities 5 are more complex and discrete, so that ghost images can be prevented from being generated without generating moiré.

More specifically, as shown in FIG. 4, projections 5c, 5d, 5e, 5f, and 5g in the shapes of cylinder 5c, semi-donut 5d, ridge section 5e, circular cone 5f, and semi-sphere 5g, respectively may be randomly combined to form the pattern of the fine irregularities 5. It is noted that projections of only one or more of the different shapes may be sufficient, and a plane of incidence 2a does not have to include projections of all shapes shown if FIG. 4. In this arrangement, various different shapes are present, in other words the fine irregularities 5 form a more complex pattern, which significantly improves the diffusion characteristic of incoming light, so that ghost images can be highly effectively reduced or eliminated. In addition, the inkjet process is preferably applied to form the complex pattern shown in FIG. 4. By the inkjet process, a complex pattern produced by calculation using a computer may be directly printed, which allows flexibility in designing shapes. The density or shape of the fine irregularities 5 may be partly changed, so that the glossiness (Gs 60°) can readily be controlled. This can be achieved on the screen of the computer, the pattern can be designed extremely simply and with high flexibility for desired design conditions as compared to the related art blasting or thermal transfer method.

Although not shown, casting process or extrusion molding process using a die provides highly accurate transfer of fine structures. Therefore, depending on how complicated and fine the shapes should be to adjust the glossiness (Gs 60°), a suitable process may be selected.

Second Exemplary Embodiment

Figure 5:
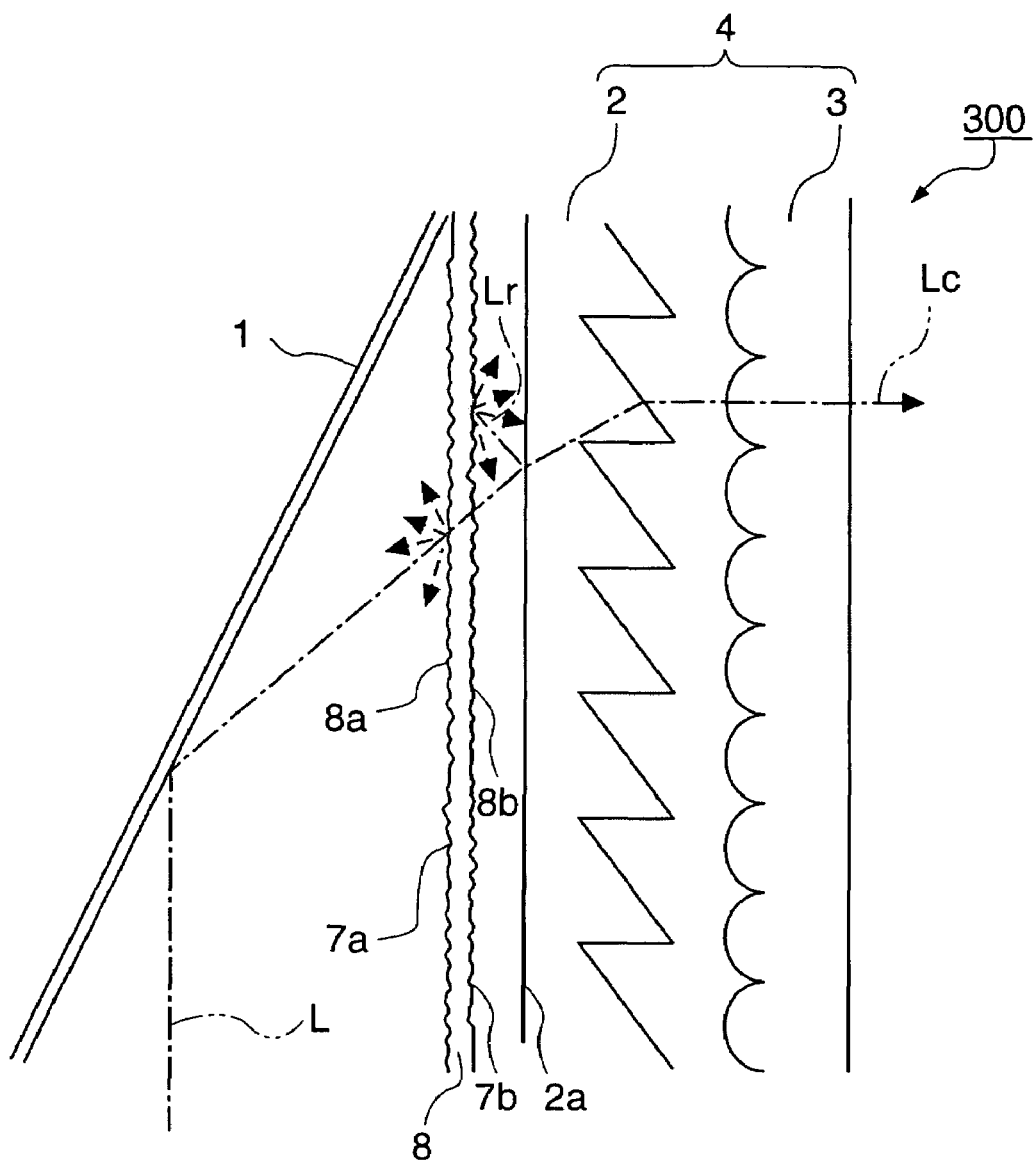
FIG. 5 is a schematic of a rear projection type liquid crystal projector according to a second exemplary embodiment of the invention.

FIG. 5 is a schematic of a rear projection type, liquid crystal projector according to a second exemplary embodiment of the invention. The rear projection type projector 300 includes a light transmission sheet 8 having fine irregularities 7a and 7b on the opposing surfaces. The sheet 8 is provided between a mirror 1 and a Fresnel lens sheet 2. The fine irregularities 7a and 7b are the same as those according to the first exemplary embodiment and formed in the same manner. Projected light L from the projector is reflected off the mirror 1 to come into the light transmission sheet 8. The plane of incidence 8a of the light transmission sheet 8 is provided with fine irregularities 7a, which scatter light other than normal projected light Lc that is to be image light. Therefore, the scattered light is subjected to vector resolution, and has its intensity weakened, and does not reach the mirror 1, in other words, does not become retroreflection light. Similarly, when light other than the normal projected light Lc is reflected off the plane of incidence 2a of the Fresnel lens sheet 2, the reflected light is scattered by the fine irregularities 7b at the plane of exit 8b (the viewer side) of the light transmission sheet 8. The scattered light Lr is subjected to vector resolution, has its intensity weakened, and will not be retroreflection light. The normal projected light Lc to be image light is transmitted through the Fresnel lens sheet 2 and projected through a lenticular lens sheet 3.

In this way, the light transmission sheet 8 is provided between the mirror 1 and the Fresnel lens sheet 2, so that the light other than the normal projected,light Lc to be image light is scattered, has its intensity weakened and does not come into the transmission screen 4. Therefore, retroreflection light is not generated. This reduces or prevents any other light from overlapping with the image light and creating ghost images. In this arrangement, the light transmission sheet 8 is discrete and operates independently from the Fresnel lens sheet 2 that is originally part of the optically designed device, and therefore the user may add the light transmission sheet 8 to the conventional rear projection type projector. For example, when the viewer is aware of ghost images formed by retroreflection while using the related art rear projection type liquid crystal projector, he/she may add the light transmission sheet 8 having prescribed fine irregularities 7a and 7b to reduce or prevent the ghost images.

Third Exemplary Embodiment

Figure 6:
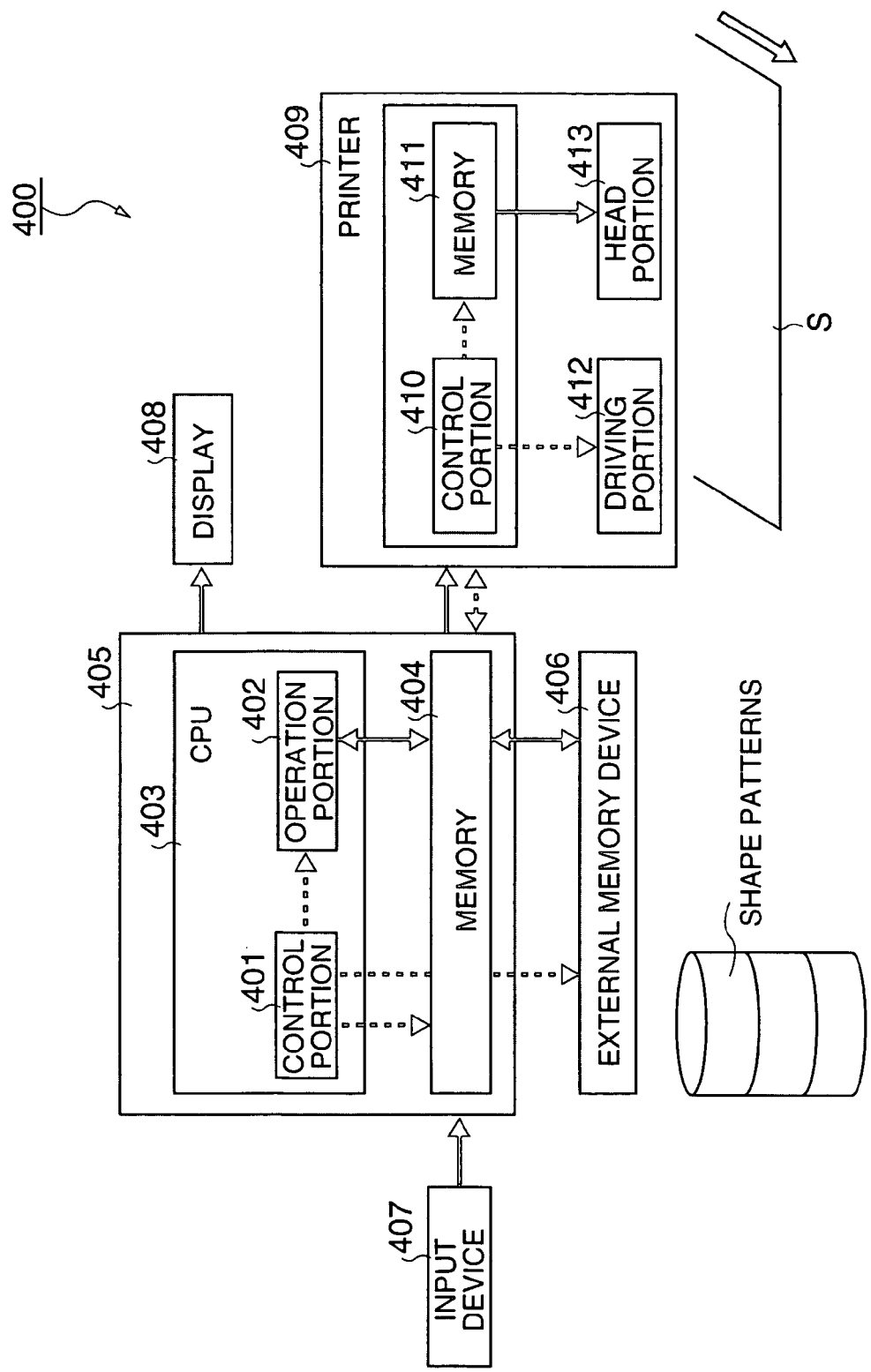
FIG. 6 is a schematic of the configuration of a fine irregularity forming device according to a third exemplary embodiment of the invention.
Figure 7:
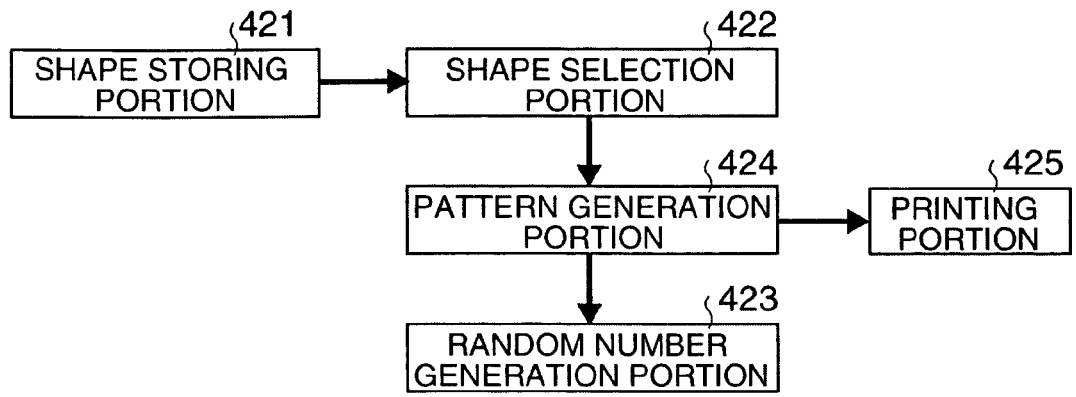
FIG. 7 is a schematic of the fine irregularity forming device shown in FIG. 6.

FIG. 6 is a schematic showing the configuration of a fine irregularity forming device according to a third exemplary embodiment of the invention. FIG. 7 is a schematic of the fine irregularity forming device shown in FIG. 6. The fine irregularity forming device 400 includes a processor 405 including a CPU 403 having a control portion 401 and an operation portion 402 and a memory 404; an external memory device 403, such as a hard disc and an optical-magnetic disc, to store prescribed programs and fine irregular shapes; an input device 407; a display 408; and an inkjet printer 409 to print fine irregularities 5. The inkjet printer 409 includes a control portion 410, a memory 411 to temporarily store data, a driving portion 412 to controllably move a light transmission sheet S, and a head portion 413 to eject ink.

As shown in FIG. 7, the fine irregularity forming device 400 includes a shape storing portion 421 that stores a plurality of fine irregular shapes, a shape selection portion 422 to select fine irregular shapes, a random number generation portion 423 to generate a random pattern, a pattern generation portion 424 to generate a fine irregularity pattern, and a printing portion 425 to print the light transmission sheet S by an inkjet process. These elements are implemented by the hardware configuration and prescribed programs shown in FIG. 6.

Figure 8:
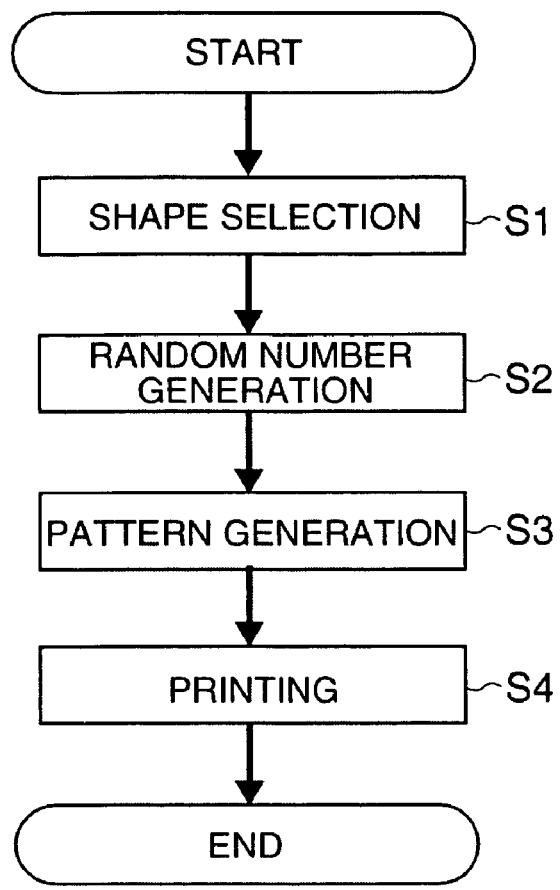
FIG. 8 is a flow chart for use in illustration of the operation of the fine irregularity forming device.
Figure 9:
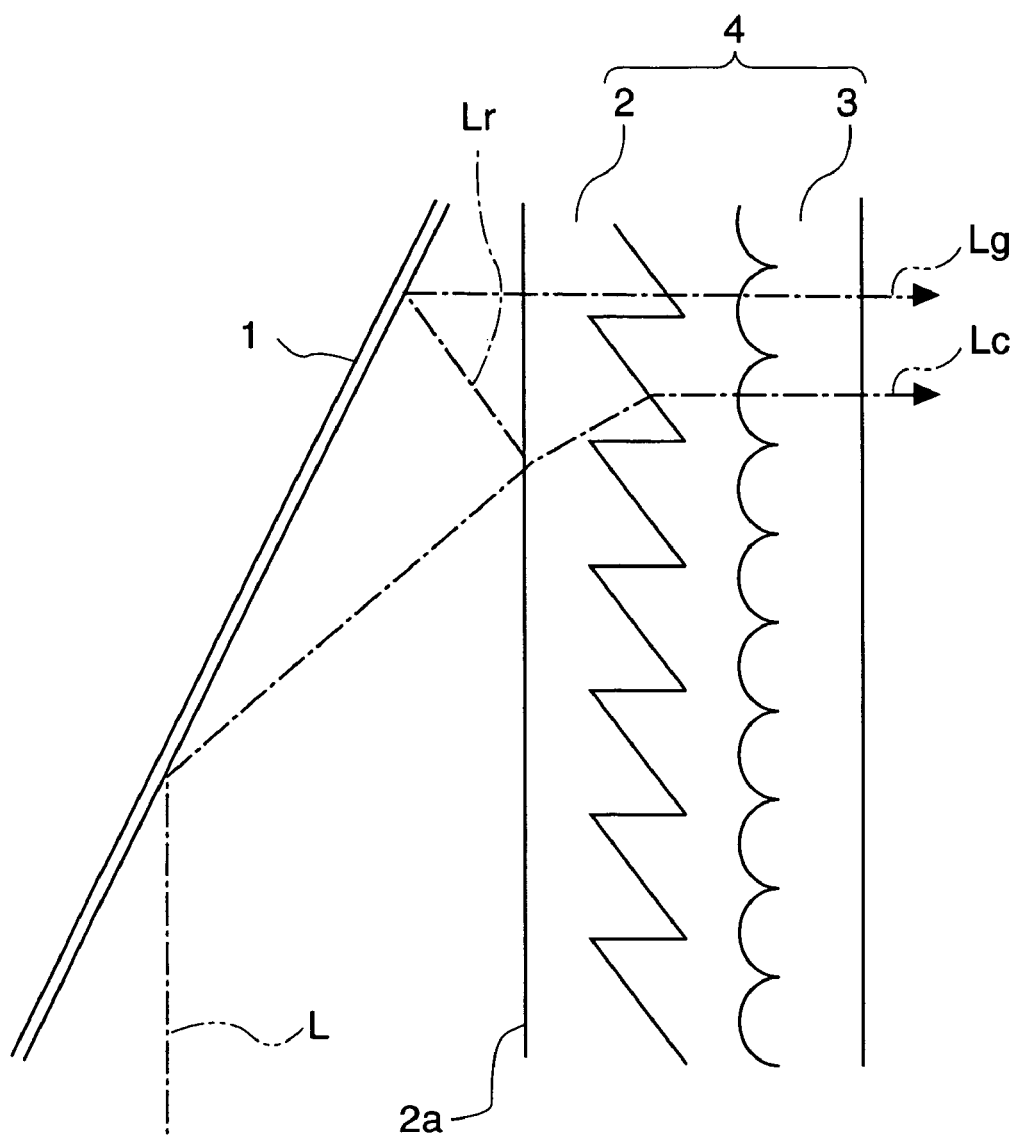
FIG. 9 is a schematic of the principle of how a ghost image is generated by retroreflection.

FIG. 8 is a flow chart for use in illustration of the operation of the fine irregularity forming device. The shape selection portion 422 selects a desired shape from the plurality of fine irregular shapes stored in the shape storing portion 421 (step S1). Fine irregular shapes are read from the external memory portion 406 and displayed at the display 408. The user selects a desired shape on the screen, and the prescribed fine irregular shape is transmitted to the pattern generation portion 424.

Then, the random number generation portion 423 generates an irreproducible random number based on a prescribed mathematical program (step S2). The pattern generation portion 424 then arranges fine irregular shapes selected based on the random number on the light transmission sheet S in a random manner (step S3). The random arrangement is optimum to provide a fine image without moiré because it eliminates interference with the lenticular lens as described above.

This random pattern can be checked on the display 408, and the pattern of fine irregular shapes is transmitted to the printing portion and temporarily stored in the memory 411. The driving portion 412 controls the light transmission sheet S and the head portion 413 to move in response to instructions from the control portion 410, and ink is ejected (step S4). The head portion 413 may be a piezoelectric or thermal type. In this way, a prescribed pattern of fine irregularities are formed on the light transmission sheet S. The ink may be pigment-based ink such as clear lacquer or a mold material such as photo-curing resin.

The fine irregularity forming device 400 forms the random pattern by operation on a computer, and therefore the fine irregular shapes can readily be arranged, or correction can be made as desired. The fine irregular shapes are formed by the inkjet process, therefore fine complex shapes can be formed readily and highly accurately. When the material is different from that of the light transmission sheet, the shapes can be formed on the top surface by the inkjet process.

In the above process, a plurality of fine irregular shapes can be selected, and the selected shapes may be randomly arranged to form a pattern. The fine irregular shapes printed based on the pattern are in a pattern for example as shown in FIG. 5. Specific sizes of the fine irregular shapes such as the level difference and the maximum diameter can be input using the input device 407 in the shape selection portion 422 and incorporated in the pattern. The printing portion 425 forms a random pattern of fine irregular shapes by printing based on the input conditions, such as the level difference and the maximum diameter.

The program to implement the functions of the elements shown in FIG. 6 may be recorded in a computer-readable medium and may be read and executed by the computer system, so that the above process may be carried out. The "computer system" herein includes OS and hardware such as peripherals. The "computer-readable medium" may be a portable medium, such as flexible magnetic disc, optical-magnetic disc, ROM, and CD-ROM, or a storage device, such as hard disc stored in the computer system.

Furthermore, the "computer-readable medium" also includes anything, such as a communication line that dynamically holds a program for a short period when the program is transmitted through a network such as the Internet or a communication line such as a telephone line, or anything that holds a program for a prescribed period, such as a volatile memory in the computer system serving as a server or a client in the above case. The program may be anything that implements a part of the above function or the above function in combination with a program already stored in the computer system.

As in the foregoing, in a light transmission sheet for use in a rear projection type projector, fine irregularities are formed on the plane of incidence to which projected light for an image comes in, and the glossiness (Gs 60°) of the plane of incidence with the fine irregularities is equal to or less than 35%. In this way, a scattering effect is provided to the plane of incidence, ghost images caused by retroreflection of projected light between the mirror and the Fresnel sheet are eliminated, and high resolution images can be provided.

In the light transmission sheet according to the invention, the haze value of the light transmission sheet having fine irregularities is at most equal to or less than 33%. In this way, the resolution of images can be maintained, while ghost images caused by retroreflection can be reduced or eliminated.

In a light transmission sheet according to the invention, fine irregularities in shapes of semi-sphere, approximate circular cone, and cylinder, and other shapes having a curved surface are randomly formed on the plane of incidence to which projected light for an image enters. In this way, the scattering effect at the plane of incidence is enhanced, and at the same time regularity can be eliminated, so that ghost images can be reduced or prevented from forming while moiré is reduced or prevented as well.

In a light transmission sheet according to the invention, fine irregularities in shapes of semi-sphere or approximate circular cone are randomly formed on the plane of incidence to which projected light for an image enters, the level difference of the fine irregularities is in the range from 5 μm to 15 μm, and the maximum diameter of the fine irregularities is in the range from 35 μm to 65 μm. In this way, the scattering effect of the plane of incidence can be controlled and ghost images can be more effectively reduced or eliminated.

In a light transmission sheet according to the invention, a random pattern of fine irregularities is generated, and then the fine irregularities are formed based on the pattern by an inkjet process. In this way, a complex pattern or a more flexible combination can readily be produced. In addition, since irregularities are directly printed on the surface of the light transmission sheet, the manufacturing process is simplified. In addition, without the necessity of a die, wasted dies are not produced, which is advantageously less costly and environmentally-friendly.

In a rear projection type projector according to the invention, at the exit plane of a light transmission sheet, a Fresnel lens of a transmission screen is formed. In this way, the light transmission sheet and the Fresnel lens sheet can be integrated, and the number of interfaces can be reduced, so that the transmittance is enhanced, and ghost images caused by retroreflection can be reduced or prevented. Consequently, a rear projection type projector that can form high resolution images can be provided.

In a rear projection type projector according to the invention, the light transmission sheet is formed between a Fresnel lens sheet and a mirror which form a transmission screen, and the plane of incidence and/or the exit plane of the light transmission sheet is provided with the fine irregularities. In this way, the light transmission sheet on its own can provide the effect, and a light transmission sheet that can reduce or prevent ghost images caused by retroreflection can be provided.

In a light transmission sheet manufacturing device according to the invention, a program, and a computer-readable medium recorded with the program according to the invention, a fine irregularity pattern to arrange fine irregularities randomly on a light transmission sheet to print is generated and fine irregularities based on the generated pattern are formed on the light transmission sheet by an inkjet process. In this way, the fine irregularities may be formed on the light transmission sheet as desired.

A light transmission sheet manufacturing device according to the invention further includes a fine irregularity selection device to select shapes of fine irregularities to be formed on the light transmission sheet from a plurality of samples. In this way, various fine irregularity shapes can be formed as desired, which allows the glossiness (Gs 60°) of the fine irregularities to be readily adjusted.

The invention claimed is:

1. A light transmission sheet for use in a rear projection type projector, comprising:
    a sheet defining fine irregularities on a surface of incidence to which projected light for an image enters, a glossiness (Gs 60°) of the surface of incidence with the fine irregularities being equal to or less than 35%.

2. The light transmission sheet according to claim 1, the haze value being equal to or less than 33%.

3. The light transmission sheet according to claim 2,
    a random pattern of the fine irregularities being generated, and the fine irregularities being then formed based on the pattern by an inkjet process.

4. A rear projection type projector, comprising:
    the light transmission sheet according to claim 1, the sheet defining an exit surface that is a Fresnel lens of a transmission screen.

5. The rear projection type projector according to claim 4, the haze value of the tranmission sheet being equal to or less than 33%.

6. The rear projection type projector according to claim 4, a random pattern of the fine irregularities being generated, and the fine irregularities being then formed based on the pattern by an inkjet process.

7. The rear projection type projector according to claim 4, the sheet defining fine irregularities in shape of at least one of a semi-sphere, an approximate circular cone, a cylinder, and other shapes having a curved surface, the fine irregularities being randomly formed on a surface of incidence to which projected light for an image enters.

8. The rear projection type projector according to claim 4,
    the sheet defining fine irregularities in shapes of semi-sphere or approximate circular cone, the fine irregularities being randomly formed on the surface of incidence to which projected light for an image enters, and
    a level difference of the fine irregularities being in a range of 5 μm to 15 μm, and a maximum diameter of the fine irregularities being in a range of 35 μm to 65 μm.

9. A rear projection type projector, comprising:
    the light transmission sheet according to claim 1 is formed between a Fresnel lens sheet of a transmission screen and a mirror;
    at least one of a surface of incidence and an exit surface of the light transmission sheet provided with the fine irregularities.

10. The rear projection type projector according to claim 9, the haze value of the transmission sheet being equal to or less than 33%.

11. The rear projection type projector according to claim 9,
    a random pattern of the fine irregularities being generated, and the fine irregularities being then formed based on the pattern by an inkjet process.

12. The rear projection type projector according to claim 9,
    the sheet defining fine irregularities in shape of at least one of a semi-sphere, an approximate circular cone, a cylinder, and other shapes having a curved surface, the fine irregularities being randomly formed on a surface of incidence to which projected light for an image enters.

13. The rear projector type projector according to claim 9,
    the sheet defining fine irregularities in shapes of semi-sphere or approximate circular cone, the fine irregularities being randomly formed on the surface of incidence to which projected light for an image enters, and
    a level difference of the fine irregularities being in a range of 5 μm to 15 μm, and a maximum diameter of the fine irregularities being in a range of 35 μm to 65 μm.

14. The light transmission sheet according to claim 1,
    the sheet defining fine irregularities in shape of at least one of a semi-sphere, an approximate circular cone, a cylinder, and other shapes having a curved surface, the fine irregularities being randomly formed on a surface of incidence to which projected light for an image enters.

15. The light transmission sheet according to claim 1, the sheet defining fine irregularities in shapes of semi-sphere or approximate circular cone, the fine irregularities being randomly formed on the surface of incidence to which projected light for an image enters, and a level difference of the fine irregularities being in a range of 5 µm to 15 µm, and a maximum diameter of the fine irregularities being in a range of 35 µm to 65 µm.

* * * * *